US008626706B2

(12) United States Patent
Babu (10) Patent No.: US 8,626,706 B2
(45) Date of Patent: Jan. 7, 2014

(54) HANDHELD ELECTRONIC DEVICE WITH REDUCED KEYBOARD AND ASSOCIATED METHOD OF PROVIDING QUICK TEXT ENTRY IN A MESSAGE

(75) Inventor: George V. Babu, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/618,991

(22) Filed: Sep. 14, 2012

(65) Prior Publication Data

US 2013/0013294 A1 Jan. 10, 2013

Related U.S. Application Data

(63) Continuation of application No. 13/454,820, filed on Apr. 24, 2012, now Pat. No. 8,290,895, which is a continuation of application No. 13/029,170, filed on Feb. 17, 2011, now Pat. No. 8,185,379, which is a continuation of application No. 12/546,782, filed on Aug. 25, 2009, now Pat. No. 7,912,704, which is a continuation of application No. 11/081,845, filed on Mar. 16, 2005, now Pat. No. 7,599,830.

(51) Int. Cl.
*G06F 17/00* (2006.01)

(52) U.S. Cl.
USPC .......... 707/603; 707/610; 707/706; 707/791; 707/828; 704/9; 704/270

(58) Field of Classification Search
USPC .......... 704/9, 10, 2, 251, 257, 270, 275, 8, 7, 704/235; 715/811, 22; 710/67; 341/22, 28
See application file for complete search history.

(56) References Cited

U.S. PATENT DOCUMENTS

| 5,434,777 | A | | 7/1995 | Luciw |
| 5,608,624 | A | | 3/1997 | Luciw |
| 5,945,928 | A | | 8/1999 | Kushler et al. |
| 5,953,541 | A | | 9/1999 | King et al. |
| 6,005,495 | A | | 12/1999 | Connolly et al. |
| 6,008,799 | A | * | 12/1999 | Van Kleeck ............... 345/173 |
| 6,141,642 | A | | 10/2000 | Oh |
| 6,289,513 | B1 | | 9/2001 | Bentwich |
| 6,307,548 | B1 | | 10/2001 | Flinchem et al. |
| 6,636,162 | B1 | | 10/2003 | Kushler et al. |
| 6,708,214 | B1 | | 3/2004 | La Fleur |
| 6,802,661 | B1 | | 10/2004 | Lee et al. |

(Continued)

FOREIGN PATENT DOCUMENTS

WO 98/33111 A1 7/1998

*Primary Examiner* — Vijay B Chawan
(74) *Attorney, Agent, or Firm* — Finnegan, Henderson, Farabow, Garrett & Dunner LLP (57) ABSTRACT

An improved handheld electronic device having a reduced keyboard provides facilitated language entry by making available to a user certain words that a user may reasonably be expected to enter. In some situations, certain words can be stored, for example, in a temporary dictionary for use in particular situations. For instance, the names of the recipients of an electronic message might be stored in a temporary dictionary for rapid retrieval when entering a salutation in the message. As another example, a number of the words in an existing electronic message may be stored in a temporary dictionary and made available to a user when replying to or forwarding the message since the existing message might include words that the user might reasonably be expected to type in the reply message or the forwarded message.

24 Claims, 6 Drawing Sheets

(56) References Cited

U.S. PATENT DOCUMENTS

| | | |
|---|---|---|
| 6,885,317 B1 | 4/2005 | Gutowitz |
| 6,901,364 B2 | 5/2005 | Nguyen et al. |
| 6,964,020 B1 | 11/2005 | Lundy |
| 7,030,863 B2 | 4/2006 | Longe et al. |
| 7,048,456 B2 | 5/2006 | Keinonen et al. |
| 7,054,952 B1 | 5/2006 | Schwerdtfeger et al. |
| 7,190,351 B1 | 3/2007 | Goren |
| 7,215,258 B2 | 5/2007 | Wormald |
| 7,312,726 B2 | 12/2007 | Fux et al. |
| 7,333,085 B2 | 2/2008 | Fux et al. |
| 7,358,866 B2 | 4/2008 | Fau et al. |
| 7,376,938 B1 | 5/2008 | Van der Hoeven |
| 7,385,531 B2 * | 6/2008 | Zhang .............................. 341/28 |
| 7,387,457 B2 | 6/2008 | Jawerth et al. |
| 7,395,203 B2 | 7/2008 | Wu et al. |
| 7,475,004 B2 | 1/2009 | Fux et al. |
| 7,477,238 B2 | 1/2009 | Fux et al. |
| 7,545,290 B2 | 6/2009 | Fux et al. |
| 7,548,849 B2 | 6/2009 | Fux et al. |
| 7,551,162 B2 | 6/2009 | Yu et al. |
| 7,555,732 B2 | 6/2009 | Van der Hoeven |
| 7,580,829 B2 | 8/2009 | James et al. |
| 7,583,205 B2 | 9/2009 | Fux et al. |
| 7,778,957 B2 | 8/2010 | Vuong |
| 7,912,704 B2 | 3/2011 | Babu |
| 7,962,857 B2 | 6/2011 | Plestid et al. |
| 2001/0006587 A1 | 7/2001 | Keinonen et al. |
| 2002/0154164 A1 * | 10/2002 | Clapper ........................ 345/752 |
| 2003/0023792 A1 * | 1/2003 | Schneider ...................... 710/73 |
| 2003/0073451 A1 * | 4/2003 | Kraft ............................ 455/466 |
| 2004/0138869 A1 * | 7/2004 | Heinecke ......................... 704/1 |
| 2004/0156562 A1 | 8/2004 | Mulvey et al. |
| 2004/0164973 A1 * | 8/2004 | Nakano et al. ................ 345/184 |
| 2005/0027524 A1 | 2/2005 | Wu et al. |
| 2005/0027534 A1 | 2/2005 | Meurs et al. |
| 2005/0108017 A1 * | 5/2005 | Esser et al. .................... 704/277 |
| 2005/0169527 A1 | 8/2005 | Longe et al. |
| 2005/0198023 A1 * | 9/2005 | James et al. ...................... 707/4 |
| 2005/0200609 A1 | 9/2005 | Van der Hoeven |
| 2005/0210402 A1 * | 9/2005 | Gunn et al. .................... 715/773 |
| 2005/0246365 A1 * | 11/2005 | Lowles et al. ................. 707/102 |
| 2005/0283364 A1 | 12/2005 | Longe et al. |
| 2006/0047498 A1 | 3/2006 | Fux et al. |
| 2006/0069990 A1 * | 3/2006 | Yozell-Epstein et al. ...... 715/527 |
| 2006/0119583 A1 * | 6/2006 | Potera ............................ 345/171 |
| 2006/0247917 A1 | 11/2006 | Fux et al. |
| 2007/0085835 A1 | 4/2007 | Plestid et al. |
| 2007/0294239 A1 | 12/2007 | Vuong |
| 2008/0009300 A1 | 1/2008 | Vuong |
| 2008/0291060 A1 | 11/2008 | Wormald |
| 2009/0221309 A1 | 9/2009 | Fux et al. |

* cited by examiner

```
                    MON. JAN. 3, 2005
52 — 12:45 P   JOHN SMITH — 56   56   60 — TENNIS
52 — 12:02 P   ZIGLEVEIT JONES         — TOMORROW'S PARTY
52 — 10:02 A   STEVEN PATTON           60 — LUNCH ?
52 — 8:02 A    JAMES DOE — 56          60 — HAPPY HOUR TONIGHT
                          56           60

```
        TO: ZIGLEVEIT JONES — 72                                    — 36
68 {    TO: WILLIAM GREER — 76
        CC: ANDREW SIMS — 80
64 —>   SUBJECT: TOMORROW'S PARTY — 100
112 —
108 —>  DEAR  ZIGLEVEIT — 140   — 104                    — 96
              124  136  128   116
        — ORIGINAL MESSAGE — 140
52 —>   FROM: ZIGLEVIET JONES — 56
        TO: WILLIAM GREER — 144
        TO: ROBERT ROBINSON
        CC: ANDREW SIMS

DEAR BILL AND BOB,
        I'M BRINGING A BOTTLE OF GIN TO
120     ANDY'S SOIRÉE. DO EITHER OF YOU INTEND  152   132
        | ZIGLEVEIT | ZIGLEVIET & WILLIAM | ZIGGY & BILL | Z | X |
         140          124      140       132    144   148  132      132
```

*FIG. 7B* ns# HANDHELD ELECTRONIC DEVICE WITH REDUCED KEYBOARD AND ASSOCIATED METHOD OF PROVIDING QUICK TEXT ENTRY IN A MESSAGE

CROSS-REFERENCE TO RELATED APPLICATIONS

This application is a continuation of U.S. patent application Ser. No. 13/454,820, filed on Apr. 24, 2012, which is a continuation of U.S. patent application Ser. No. 13/029,170, filed on Feb. 17, 2011, issued as U.S. Pat. No. 8,185,379, which is a continuation of U.S. patent application Ser. No. 12/546,782, filed on Aug. 25, 2009, issued as U.S. Pat. No. 7,912,704, which is a continuation of U.S. patent application Ser. No. 11/081,845, entitled "Handheld Electronic Device with Reduced Keyboard and Associated Method of Providing Quick Text Entry in a Message", filed on Mar. 16, 2005, and issued as U.S. Pat. No. 7,599,830, all of which are incorporated herein by reference in their entirety.

BACKGROUND OF THE INVENTION

1. Field of the Invention

The invention relates generally to handheld electronic devices and, more particularly, to a handheld electronic device that has a reduced keyboard and that facilitates the entry of text in a message.

2. Description of the Related Art

Numerous types of handheld electronic devices are known. Examples of such handheld electronic devices include, for instance, personal data assistants (PDAs), handheld computers, two-way pagers, cellular telephones and the like. Many handheld electronic devices also feature a wireless or other communication capability, although other handheld electronic devices are stand-alone devices that are functional without communication with other devices. Such handheld electronic devices are generally intended to be portable, and thus are of a relatively compact configuration in which keys and other structures often perform multiple functions under certain circumstances or may otherwise have multiple aspects or features assigned thereto. With advances in technology, handheld electronic devices are built to have progressively smaller form factors yet have progressively greater numbers of applications and features resident thereon. As a practical matter, the keys of a keypad can only be reduced to a certain small size before the keys become relatively unusable.

In language entry applications, such as in a messaging or e-mail application, a keypad must be capable of generating substantially all of the elements desirable or necessary to form the relevant language. For example, in a language that employs Roman letters, a keypad must be capable of generating substantially all twenty-six of the Roman letters. In order to provide such functionality with relatively few keys, some keypads have included multiple linguistic elements per key, such as providing a plurality of Roman letters on each of at least some of the keys when the keypad is used to generate a language that employs Roman letters.

In order to make use of the multiple linguistic elements on any given key, numerous keystroke interpretation systems have been provided. For instance, a "multi-tap system" allows a user to substantially unambiguously specify a particular linguistic element, for example, on a key by pressing the same key a number of times equal to the position of the desired linguistic element on the key. Anther keystroke interpretation system includes key chording in which keys are pressed in various combinations to achieve particular results. Still another keystroke interpretation system might include a disambiguation routine which seeks to interpret the keystrokes in view of stored dictionary data, linguistic rules, stored algorithms, and/or the like.

While such disambiguation systems have been generally effective for their intended purposes, such disambiguation systems are not without limitation. In certain applications, the function of a disambiguation routine can be cumbersome if a user must expend substantial effort in entering language. One such situation in which this may occur is in the context of a word that may not already be in the stored dictionary. Another exemplary situation in which this may occur is when a word is already be stored in the dictionary but is considered to have a relatively low frequency, and this may require significant input effort by the user to achieve the desired word. Also, a desired word may not already be stored in the dictionary of the device. It thus would be desirable to provide a handheld electronic device having a reduced keyboard wherein the device might make available to a user words and the like that the user might reasonably be expected to enter. Such words and the like might, for example, be somewhat unconventional.

SUMMARY OF THE INVENTION

In view of the foregoing, an improved handheld electronic device having a reduced keyboard provides facilitated language entry by making available to a user certain words that a user may reasonably be expected to enter. In some situations, certain words can be stored, for example, in a temporary dictionary for use in particular situations. For instance, the names of the recipients of an electronic message might be stored in a temporary dictionary for rapid retrieval when entering a salutation in the message. As another example, a number of the words in an existing electronic message may be stored in a temporary dictionary and made available to a user when replying to or forwarding the message since the existing message might include words that the user might reasonably be expected to type in the reply message or the forwarded message.

Accordingly, an aspect of the invention is to provide an improved handheld electronic device that has a reduced keyboard and that provides facilitated entry of language.

Another aspect of the invention is to provide an improved handheld electronic device having a reduced keyboard that can store certain data in one or more temporary dictionaries for retrieval in certain contexts.

Another aspect of the invention is to provide an improved handheld electronic device that has a reduced keyboard and that provides facilitated entry of a salutation in an electronic message to a recipient of the message.

Another aspect of the invention is to provide an improved handheld electronic device that has a reduced keyboard and that facilitates the entry of words in an electronic message on the basis of the word having previously appeared in another electronic message in the same message thread.

Another aspect of the invention is to provide an improved method of enabling disambiguation of an entry on a handheld electronic device having a reduced keyboard.

These and other aspects of the invention are provided by an improved method of enabling disambiguation of an input into a handheld electronic device. The handheld electronic device includes an input apparatus, an output apparatus, and a memory having a plurality of objects stored therein. The plurality of objects include a plurality of language objects and a plurality of frequency objects, with each of at least a portion of the language objects of the plurality of language objects being associated with an associated frequency object of the plurality of frequency objects. The handheld electronic device has a number of messages available thereon, with each message of at least a portion of the number of messages including a number of language objects. The input apparatus includes a plurality of input members, with each of at least a portion of the input members of the plurality of input members having a plurality of linguistic elements assigned thereto. The general nature of the method can be stated as including detecting at least one of a replying input and a forwarding input with respect to a message of the number of messages, detecting an ambiguous input including a number of input member actuations of a number of the input members of the plurality of input members, with each of at least a portion of the input members of the number of input members including a number of linguistic elements assigned thereto, and with at least one of the input members of the number of input members having a plurality of linguistic elements assigned thereto, determining that a first portion of the memory is associated with the message, with the first portion of the memory including at least a portion of the language objects of the number of language objects of the message, identifying in the first portion of the memory a first language object that corresponds with the ambiguous input, and outputting at least a portion of the first language object as a first proposed disambiguation of the ambiguous input.

Other aspects of the invention are provided by an improved method of enabling disambiguation of an input into a handheld electronic device. The handheld electronic device includes an input apparatus, an output apparatus, and a memory having a plurality of objects stored therein. The plurality of objects include a plurality of language objects and a plurality of frequency objects. The handheld electronic device has a number of messages available thereon, with each message of at least a portion of the number of messages including a number of language objects. Each of at least a portion of the language objects of the plurality of language objects is associated with an associated frequency object of the plurality of frequency objects. The input apparatus includes a plurality of input members, with each of at least a portion of the input members of the plurality of input members having a plurality of linguistic elements assigned thereto. The general nature of the method can be stated as including detecting at least one of a replying input and a forwarding input with respect to a message of the number of messages, storing in a first portion of the memory at least a portion of the language objects of the number of language objects of the message, detecting an ambiguous input including a number of input member actuations of a number of the input members of the plurality of input members, with each of at least a portion of the input members of the number of input members including a number of linguistic elements assigned thereto, and with at least one of the input members of the number of input members having a plurality of linguistic elements assigned thereto, identifying in the first portion of the memory a language object that corresponds with the ambiguous input, and outputting at least a portion of the language object as a first proposed disambiguation of the ambiguous input.

Other aspects of the invention are provided by an improved handheld electronic device, the general nature of which can be stated as including a processor apparatus, an input apparatus, and an output apparatus. The processor apparatus includes a memory having a plurality of objects stored therein, with the plurality of objects including a plurality of language objects and a plurality of frequency objects. Each of at least a portion of the language objects of the plurality of language objects is associated with an associated frequency object of the plurality of frequency objects. The input apparatus includes a plurality of input members, with each of at least a portion of the input members of the plurality of input members having a plurality of linguistic elements assigned thereto. The handheld electronic device has a number of messages available thereon, with each message of at least a portion of the number of messages including a number of language objects. The processor apparatus is adapted to detect at least one of a replying input and a forwarding input with respect to a message of the number of messages The processor apparatus is adapted to detect an ambiguous input including a number of input member actuations of a number of the input members of the plurality of input members, with each of at least a portion of the input members of the number of input members including a number of linguistic elements assigned thereto, and with at least one of the input members of the number of input members having a plurality of linguistic elements assigned thereto. The processor apparatus is adapted to make a determination that a first portion of the memory is associated with the message, with the first portion of the memory including at least a portion of the language objects of the number of language objects of the message. The processor apparatus is adapted to identify in the first portion of the memory a first language object that corresponds with the ambiguous input. The processor apparatus is adapted to output to the output apparatus an output including at least a portion of the first language object as a first proposed disambiguation of the ambiguous input.

BRIEF DESCRIPTION OF THE DRAWINGS

A full understanding of the invention can be gained from the following Description of the Preferred Embodiments when read in conjunction with the accompanying drawings in which.

Similar numerals refer to similar parts throughout the specification.

DESCRIPTION OF THE PREFERRED EMBODIMENTS

Figure 1:
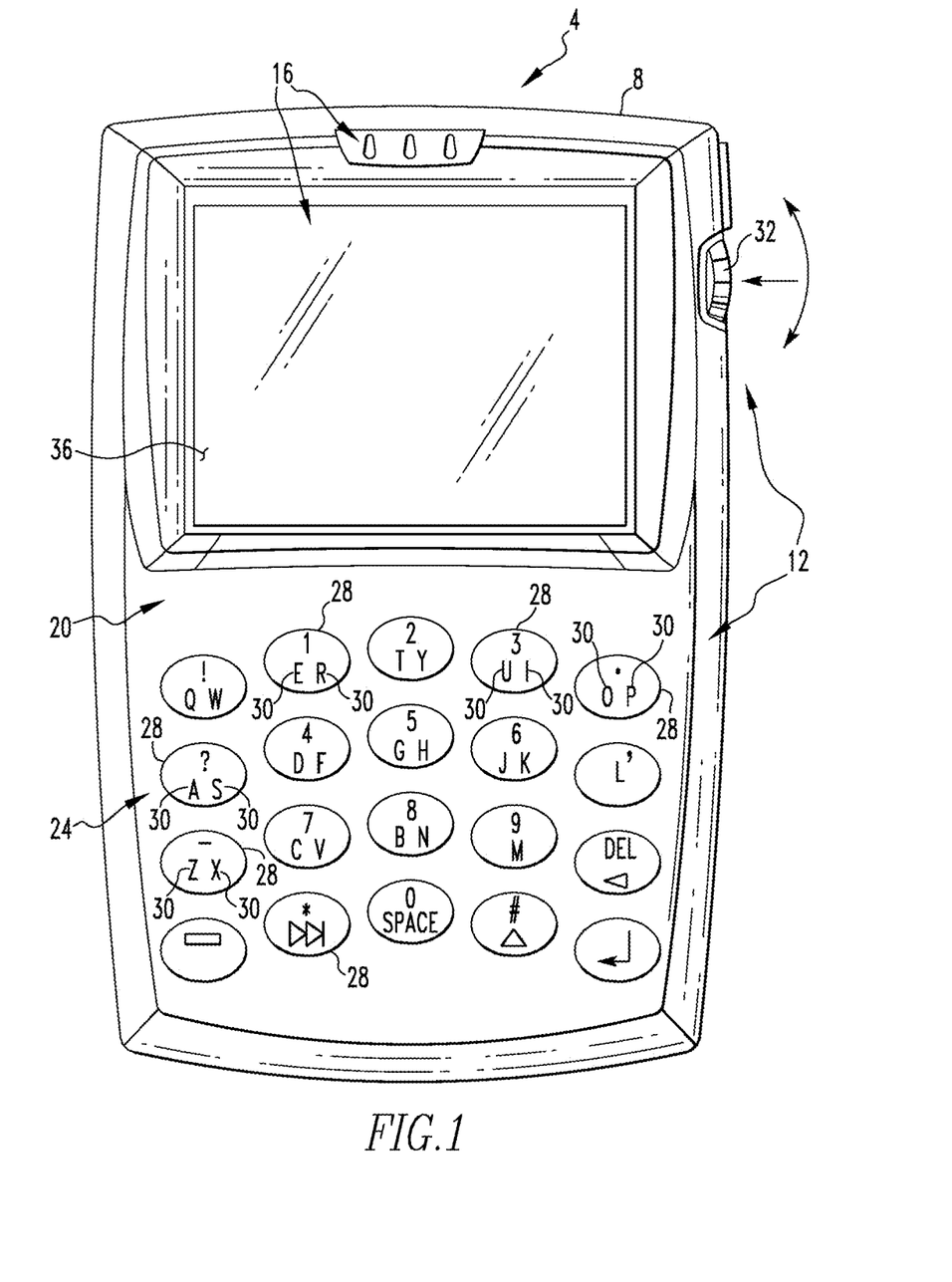
FIG. 1 is a front elevational view of an improved handheld electronic device in accordance with the invention.
Figure 2:
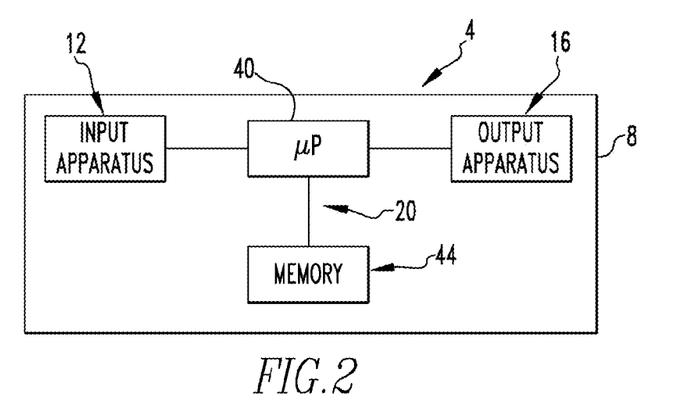
FIG. 2 is a schematic view of the handheld electronic device of FIG. 1.

An improved handheld electronic device 4 in accordance with the invention is indicated generally in FIGS. 1 and 2. The handheld electronic device 4 includes a case 8, an input apparatus 12, an output apparatus 16, and a processor apparatus 20. The present exemplary embodiment of the handheld electronic device 4 includes applications and/or routines resident thereon such as, for example, and without limitation, a disambiguation routine and an e-mail client, although other and/ or additional applications and/or routines can be provided without departing from the concept of the invention.

The input apparatus includes a keypad 24 that includes a plurality of keys 28. The input apparatus 12 additionally includes a track wheel 32 for additional input. Many of the keys 28 have one or more letters 30 assigned thereto, and a some of the keys 28 have a plurality of letters 30 assigned thereto. In the present exemplary embodiment, the exemplary letters 30 are Roman letters, and the exemplary Roman letters serve as linguistic elements for language entry into the handheld electronic device 4. It is understood that while the linguistic elements of the instant exemplary embodiment are depicted as being characters, specifically Roman letters, the linguistic elements could be other elements such as, for example and without limitation, other types of characters, ideograms, portions of ideograms such as strokes, and other elements that can be used in the generation of language. The expressions "text" and "word", and variations thereof, are to be broadly construed herein and are not intended to be limiting in any fashion with regard to a particular language, a particular portion of a language or a means of providing an expression in a language, or to a particular language type or format.

The output apparatus 16 in the present exemplary embodiment includes a display 36. The output apparatus 16 may additionally include other output devices such as lights, speakers, and other output devices without limitation.

As can be seen in FIG. 2, the processor apparatus 20 includes a processor which may be, for instance and without limitation, a microprocessor (μP) 40 and which is responsive to inputs from the input apparatus 12 and provides output signals to the output apparatus 16. The processor apparatus 20 additionally includes a memory 44 with which the microprocessor 40 interfaces. The memory 44 can be any of a variety of storage devices such as, for example and without limitation, RAM, ROM, EPROM, EEPROM, and/or other devices.

The memory 44 includes a generic word list 48 that has a plurality of language objects and frequency objects stored therein. The language objects are, in the instant example, representative of words. The language objects and the frequency objects are associated. A given frequency object is representative of a frequency value that reflects, for instance, the relative likelihood that a language object with which the frequency object is associated is what is intended by a user when the user makes an input via the keypad 24. The memory 44 includes other objects stored and organized therein, as will be described in greater detail below.

The processor apparatus 20 has resident thereon a disambiguation routine that interfaces with the memory 44 and the objects stored therein to provide output in response to input via the input apparatus 12. In accordance with the invention, and in certain situations, certain words and the like may be stored in one or more temporary dictionaries in the memory 44 and made available to the user, such as when the user might reasonably be expected to wish to input such words. The words in such a temporary dictionary may be accorded a relatively high frequency value in order that such words, if appropriate, will be presented in whole or in part to the user at an early opportunity during the text entry process to limit the editing effort and other input that might otherwise be required to enter such words.

Figure 4:
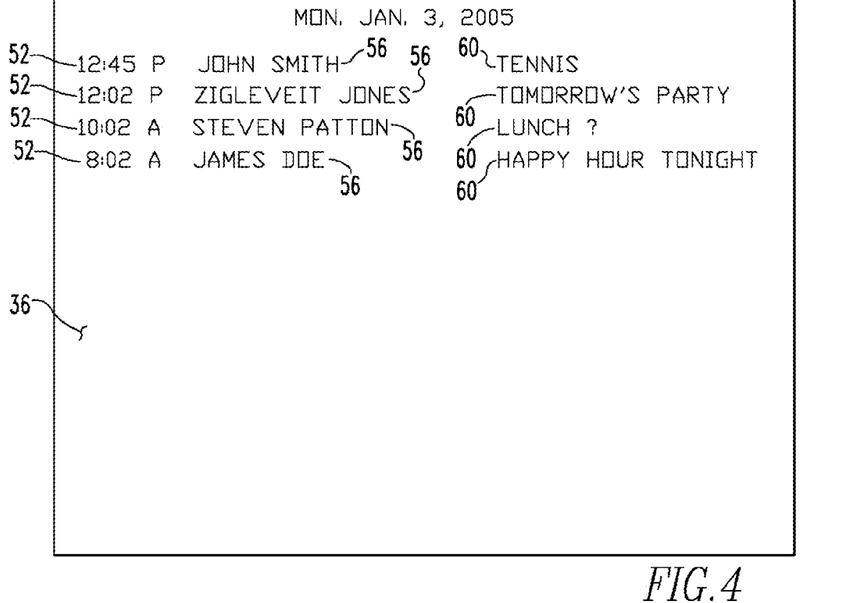
FIG. 4 is a first exemplary output on the handheld electronic device of FIG. 1 in accordance with an aspect of a method of the invention.

Although many uses for the invention will be apparent, one exemplary use of the invention is presented herein as being in the context of electronic mail. As can be seen in FIG. 4, for example, a number of existing messages 52 are available on the handheld electronic device 4. That is, the messages 52 may either be stored directly on the handheld electronic device 4 or may be downloadable on demand, for example.

The exemplary messages 52 in FIG. 4 each include, for instance, a sender 56 and a subject 60 for reference by the user.

In a situation where, for example, a user enters a replying or forwarding command with respect to one of the messages 52, the user can reasonably be expected to wish to enter certain language. Such expected language might include, for example, a salutation to one of the recipients and/or, by way of additional example, a reference to something that has already been referred to in a prior message in the same message thread. In some circumstances, some of the language that a user can reasonably be expected to wish to enter can be ascertained prior to entry of such language by the user. In accordance with an aspect of the invention, therefore, certain language is advantageously stored in one or more temporary dictionaries in the memory 44 for ready use by user in entering language.

Figure 5:
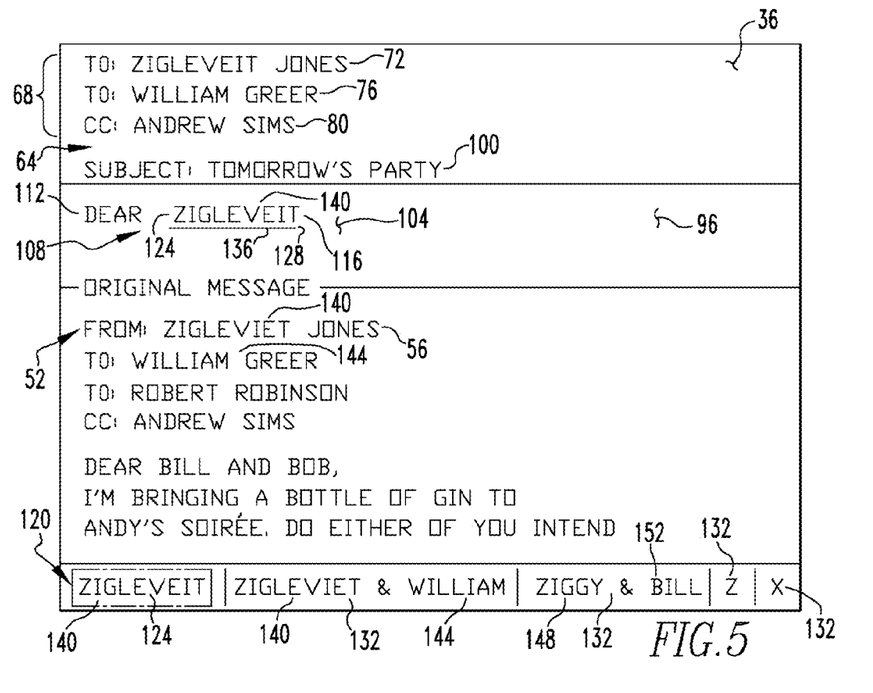
FIG. 5 is another exemplary output on the handheld electronic device in accordance with an aspect of a method of the invention.
Figure 6:
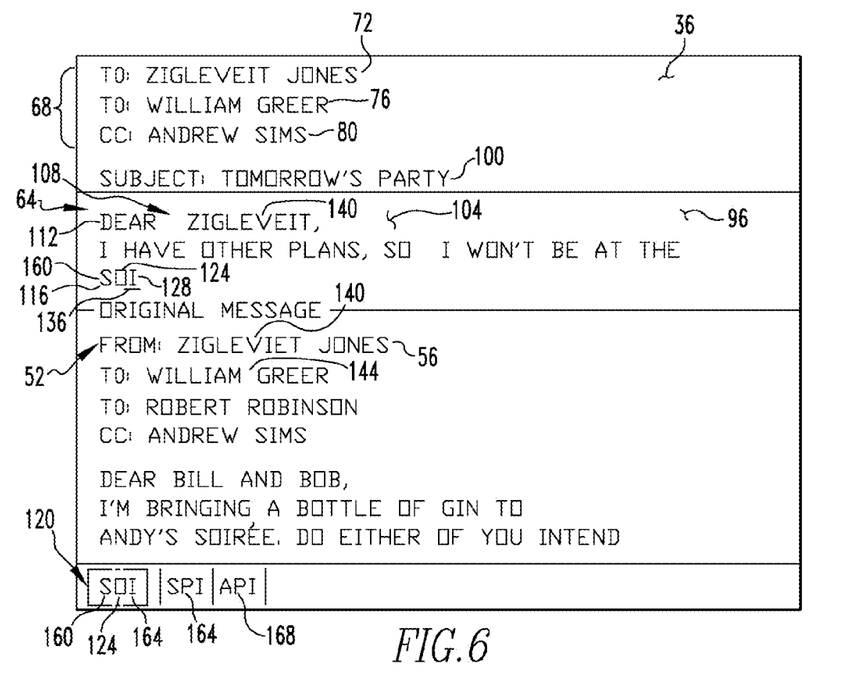
FIG. 6 is another exemplary output on the handheld electronic device in accordance with an aspect of a method of the invention.

Such an example is presented in FIGS. 4-6. If a replying or forwarding command, for example, is entered with respect to one of the messages 52, the e-mail client application resident on the handheld electronic device 4 will generate a new message 64 that employs certain data available in the original message 52. For example, the new message 64 may include a number of recipients 68 and a subject 100. The recipients 68 in the present example include a first recipient 72, a second recipient 76, and a copied recipient 80. In the present example the user has entered a replying input with respect to the indicated message 52, and accordingly the sender 56 of the original message 52 becomes the first recipient 72 of the new message 64. The second recipient 76, may, for example and without limitation, have been another recipient of the message 52, and the copied recipient 80 may, for example, and without limitation, have been a copied recipient of the original message 52. It is also noted that the subject 100 is the same as the subject 60, and that the new message 64 and the original message 52 are in a common e-mail thread.

It is noted that in generating the exemplary new message 64, the e-mail client application fills in the names of the recipients 68 and the subject 100. The e-mail client application or other application or routine may advantageously also create a first temporary dictionary 84 (FIG. 3) in the memory 44 and may store the names of the recipients 68 therein. For example, the names of the recipients 68 may be stored as language objects in the first temporary dictionary 84. The first temporary dictionary 84 may additionally include frequency objects stored therein that provide frequency values for association with the stored language objects. Alternatively, the language objects in the first temporary dictionary 84 may be associated in some other fashion with a frequency value that is relatively high. In this regard, and as will be set forth in greater detail below, the exemplary disambiguation routine employed on the handheld electronic device 4 identifies language objects in the memory 44 and presents the language objects, in whole or in part, to the user in response to an ambiguous input for the purpose of providing proposed disambiguated interpretations of the ambiguous input. The output oftentimes may include a plurality of language objects, in whole or in part, listed in some fashion in a descending order of frequency value and/or in accordance with other criteria. By associating with the language objects stored in the first temporary dictionary 84 frequency objects of a relatively high frequency value, the language objects identified in the first temporary dictionary 84 during operation of the disambiguation routine may be output at a position of relatively high probability, i.e., frequency, in order to make such language objects readily available to the user. Such ready access to such language objects by the user facilitates entry and reduces the amount of input effort that may otherwise be required of the user.

The exemplary new message 64 is depicted in FIG. 5 as including the recipients 68, the subject 100, and some text in a language input field 96 of the new message 64. In FIG. 5, the exemplary text is being input on a first line 104, i.e., an initial line, in the language input field 96 and is in the form of a salutation 108. The exemplary salutation 108 includes a salutatory expression 112. The salutatory expression 112 in the present example is the word "Dear", which is recognizable as being a salutatory expression 112 from among a number of known salutatory expressions 112 such as, for example and without limitation, "Hi", "Hello", "Hey", and others. As employed herein, a "salutatory expression" and variations thereof shall refer broadly to any linguistic or other type of expression which indicates a greeting or other annunciation directed toward a recipient of a communication. The handheld electronic device 4 may have a number of salutatory expressions 112 stored therein in order to enable the recognition of a given input as being a part of a salutation 108 by virtue of it including a known salutatory expression 112.

Adjacent the exemplary salutatory expression 112 is a text input location 128 indicated by a cursor 136. In the vicinity of the cursor 136 is an exemplary first name 140. FIG. 5 represents an exemplary output on the display 36 after the user has entered a replying input with regard to one of the original messages 52, as mentioned above, and has additionally provided an ambiguous input by actuating the key 28 having assigned thereto the letters 30 "Z" and "X". The disambiguation routine has recognized that the aforementioned ambiguous input was intended to be part of the salutation 108 since the current text input location 128 is disposed adjacent the salutatory expression 112 that had been identified as such by the disambiguation routine. The disambiguation routine may be configured to additionally recognize any input on the first line 104 of the language input field 96 as being a salutation 108 regardless of additionally being adjacent a salutatory expression 112. This may be useful in a situation where the salutation does not include a salutatory expression, and rather includes only the recipient's name. This may also be useful when a plurality of names are being entered as a part of the salutation, whereby not all of the names will be disposed directly beside a single initial salutatory expression.

In seeking to interpret the aforementioned ambiguous input, which could be intended to be the initial letter of a word starting with "Z" or a word starting with "X", the disambiguation routine sought to identify in the first temporary dictionary 84 a language object stored therein that corresponds with either "Z" or "X", and resultingly identified the first name 140 of "ZIGLEVEIT" since the names of the recipients 68 have been stored in the first temporary dictionary 84. Associated with such first name 140 would be a relatively high frequency value. The output of FIG. 5 indicates that the disambiguation routine has additionally identified in the generic word list 48 one or more language objects beginning with the letter "Z" and one or more language objects beginning with the letter "X". Such language objects would have associated therewith frequency objects having frequency values that are relatively lower than the frequency value associated with the first name 140.

In providing the output of FIG. 5 on the display 36, the disambiguation routine may have compared the frequency values associated with those language objects identified in the first temporary dictionary 84 and in the generic word list 48 as corresponding with the aforementioned ambiguous input, and may have determined that the first name 140 was associated with the highest frequency value. This may have been because all of the language objects in the first temporary dictionary 84 will have associated therewith relatively high frequency values.

The output in the present exemplary embodiment depicted FIG. 5 includes a text component 116 and a variant component 120. The text component 116 is output at the text input location 128. The variant component 120 is, in the exemplary embodiment of the depicted handheld electronic device 4, output at a lower region of the display 36. The contents of the output include a default output 124 and a number of variants 132. The default output 124 is depicted as being output as both the text component 116 at the text input location 128 and as the leftmost variant 132 in the variant component 120. In addition to the variant component 120 including the default output 124, the variant component 120 outputs a number of variants 132 adjacent the default output 124 to provide alternate proposed outputs.

In the present example, the user, in actuating the key 28 to which the letters 30 "Z" and "X" are assigned, likely intended to enter the name "ZIGLEVEIT" as part of the salutation 108 since the first recipient 72 is "ZIGLEVEIT JONES". The first name 140 "ZIGLEVEIT" is unlikely to previously have been stored in the generic word list 48 or otherwise in the memory 44. By storing the first name 140 "ZIGLEVEIT" in the first temporary dictionary 84, the effort that otherwise would have been required of the user in entering the exemplary first name 140 "ZIGLEVEIT" is reduced. That is, in the absence of the first temporary dictionary 84 the disambiguation routine might have offered numerous variants to the user in attempting to predict the intent of the user in providing the aforementioned input, and such variants may have required numerous selection and/or movement inputs by the user in ultimately entering the name "ZIGLEVEIT". By making available as a high frequency variant the first name "ZIGLEVEIT", the additional effort that otherwise might have been required of the user in entering the first name 140 of the salutation 108 is reduced.

In certain disambiguation systems, the proposed output responsive to an input may be only the same length as the input. That is, in certain disambiguation routines the proposed output in response to a single keystroke might be a number of variants 132 that are only a single character, i.e., letter 30, in length. In the present exemplary embodiment of the disambiguation routine, however, the proposed output in response to the single keystroke of the key 28 to which the letters 30 "Z" and "X" are assigned was the entire first name 140 "ZIGLEVEIT". The disambiguation routine thus provided a disambiguation in the nature of a predicted entire word in response to an ambiguous input consisting of a single keystroke. This is particularly advantageous because it avoids the need of the user to actuate all of the keys 28 that might otherwise be required to spell the first name 140 "ZIGLEVEIT". In accordance with an aspect of the invention, therefore, the disambiguation routine determined that the current input was a part of the salutation 108, i.e., by determining that the text input location 128 was adjacent the salutatory expression 112 from among a number of predetermined salutatory expressions 112 and/or by being disposed at the first line 104 of the language input field 96. Since the salutation likely will be limited to the names of the recipients 68, the prediction of the entire first name 140 from the aforementioned single keystroke saves time and effort on the part of the user. In other embodiments, however, the output need not include an entire predicted name, and rather may be a letter-for-keystroke output.

In accordance with another aspect of the invention, the disambiguation routine may additionally provide a second name 144 as a variant 132 in combination with the first name 140, thus "ZIGLEVEIT & WILLIAM". The first name 140 and the second name 144 correspond with the first recipient 72 and the second recipient 76, respectively. As such, in addition to providing as the default output 124 the entire first name 140, "ZIGLEVEIT", the disambiguation routine additionally can provide as a first variant 132 the combined first and second names 140 and 144 of "ZIGLEVEIT & WILLIAM". This saves additional time to the user if it is desired to provide the salutation 108 as addressing both the first and second recipients 72 and 76.

Depending upon the data stored in the memory 44, the variant component 120 of the output might additionally include, for example, a first friendly name 148 of "Ziggy" and/or a second friendly name 152 "Bill", with the first and second friendly names 148 and 152 corresponding with the first and second names 140 and 144, respectively. Such a friendly variant 132 would provide an additional alternative in entering the salutation 108. The disambiguation routine has provided as additional variants 132 the variant 132 "Z" and the variant "X" as lower priority variants 132, and these may be provided for use in the event that the user has desired to enter a word beginning with either "Z" or "X" without intending to enter the first name 140. In the present example, the first name 140 is provided as the default output 124 since the single keystroke by the user is most likely to have been intended as beginning the input of the first name 140, which would be a likely entry as a part of the salutation 108.

A further aspect of the invention is depicted generally in FIG. 6. In FIG. 6 the user has accepted the first name 140 "ZIGLEVEIT" and has continued to enter additional text in the language input field 96. In accordance with the invention, the disambiguation routine or other routine has caused certain language objects to be stored in the memory 44 and to be made available to the user at a relatively high priority to facilitate entry of the text.

More specifically, many of the words in the original message 52 have been stored as language objects in a second temporary dictionary 92 in the memory 44. Such second temporary dictionary 92 may have been generated, for example, upon detection of the aforementioned replying input or a forwarding input with respect to the original message 52. Alternatively, if prior messages 52 in the same message thread as the original message 52 and the new message 64 of FIG. 6 had been replied to and/or forwarded by the user, for instance, the second temporary dictionary 92 associated with that message thread may have been generated at the time of such replying to and/or forwarding. Other variations will be apparent.

Figure 3:
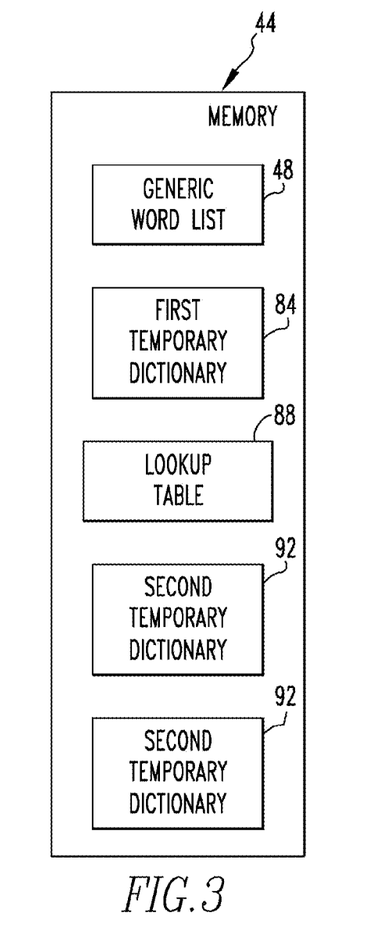
FIG. 3 is a schematic view of a portion of a processor apparatus of the handheld electronic device of FIG. 2.

In one embodiment of the invention, the memory 44 may include a plurality of second temporary dictionaries 92, each being associated with a corresponding message 52 and/or message thread. The disambiguation routine could identify such second temporary dictionaries 92 through the use of a lookup table 88 that might include, for instance, a table of first entries that are associated with messages 52 and/or message threads, and corresponding second entries having pointers to locations in the memory 44 where the appropriate second temporary dictionary 92 is located. In another embodiment, the memory 44 may include only a single second temporary dictionary 92 that is created upon replying to or forwarding message 52, with the stored language objects thereof being replaced with other language objects contained in another message 52 upon replying to or forwarding of the another message 52.

In the present exemplary embodiment of the handheld electronic device 4, upon detecting a replying or forwarding input with respect to one of the messages 52, the disambiguation routine determines from the lookup table 88 whether or not a second temporary dictionary 92 has already been generated for the particular message 52 and/or the related message thread, if any. In this regard, the first entries in the lookup table 88 with which the messages 52 are associated may, for example, include the subject 60 of the message 52 or may be in the form of a hash of the subject 60 of the message 52. A message thread including the message 52 could thus be identified so long as the subject 60 has not been changed. Other methods of identifying a given message 52 and/or message thread will be apparent.

If no corresponding second temporary dictionary 92 has yet been created for the given message 52, the disambiguation routine or other routine could generate the second temporary dictionary 92 by storing at a particular location in the memory 44 language objects corresponding with some or all of the words in the message 52. Such language objects could be associated with a relatively high frequency value, either by having corresponding frequency objects stored in the memory 44, by assigning to all language objects in the second temporary dictionary 92 a relatively high frequency value, or in other apparent fashions. Once a corresponding second temporary dictionary 92 has already been created for the message 52 and/or for the corresponding message thread, the respective second temporary dictionary 92 can be interrogated by the disambiguation routine in seeking to identify language objects stored therein that correspond with an ambiguous input into the handheld electronic device 4.

That is, a user may enter an ambiguous input in the form of a number of keystrokes of the keys 28. If any of the keys 28 has a plurality of letters 30 or other linguistic elements assigned thereto, the input will be ambiguous. With each successive keystroke, the disambiguation routine may interrogate the generic word list 48 for corresponding language objects and associated frequency objects, and will also seek to identify language objects stored in the corresponding second temporary dictionary 92, along with seeking associated frequency values for such language objects in the second temporary dictionary 92. The disambiguation routine potentially may also interrogate the first temporary dictionary 84 in seeking to identify additional language objects that correspond with the ambiguous input. The corresponding identified language objects from the generic word list 48 and the second temporary dictionary 92 (and first temporary dictionary 84, if appropriate) are then output in order of frequency value.

An example of the benefits provided by the second temporary dictionaries 92 is indicated generally in FIG. 6. It can be seen that the original message 52 included, among other words, the word "soirée". The word "soirée" may be stored in the generic word list 48 as a language object, and such language object may be associated with a relatively low frequency value, or it may not be present at all in the generic word list 48. By storing in the second temporary dictionary 92 a language object corresponding with the word "soirée" and associating it with a relatively high frequency value, the language object corresponding with "soirée" can be readily provided to the user in entering the text of the new message 64.

In the example depicted in FIG. 6, the user has begun typing the word "soirée" by entering an ambiguous input consisting of three keystrokes of keys 28. Specifically, the user has actuated the keys 28 "A S", "O P", and "U I". Other exemplary words in the generic word list 48 such as "SPIN" and "APIECE" also correspond with the aforementioned three-keystroke ambiguous input. In the generic word list 48, the words "SPIN" and "APIECE" are likely to be associated with higher frequency values than any language object stored in the generic word list 48 corresponding with the word "soirée". However, since the second temporary dictionary 92 associated with the new message 64 includes a language object corresponding with the word "soirée", with such language object having associated therewith a relatively high frequency value, the default output 160 "SOI" corresponds with the word "soirée", which is the word desired by the user. The output also includes a first variant output 164 "SPI" and a second variant output 168 "API" which might correspond with the otherwise relatively higher frequency words "SPIN" and "APIECE", respectively. As such, providing the second temporary dictionary 92 reduces the number of keystrokes and/or the number of editing inputs and/or the amount of attention required of a user in entering the text in the new message 64, which is advantageous.

Figure 7A:
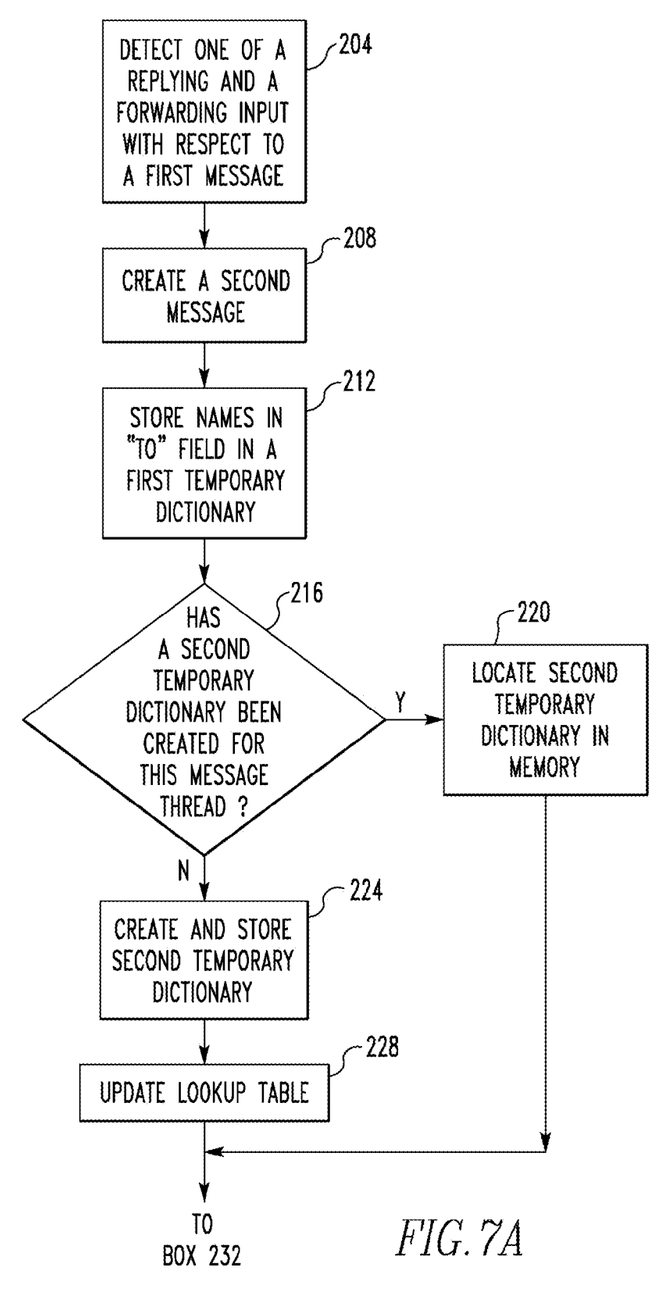
FIGS. 7A and 7B is an exemplary flowchart depicting at least a portion of the method of the invention.
Figure 7B:
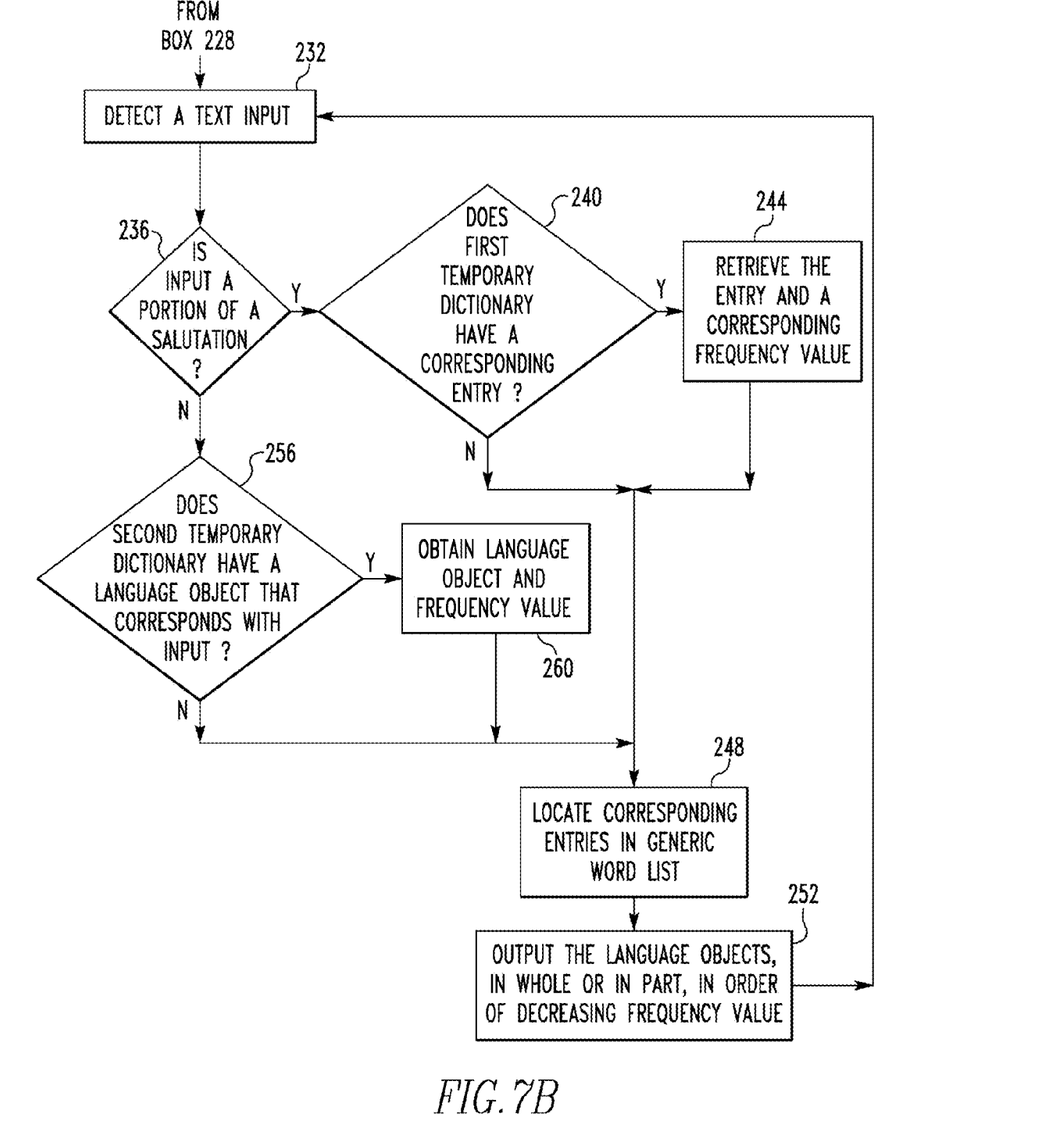

An exemplary flowchart in FIGS. 7A and 7B depicts in general terms the method of the invention. The method of the invention can be said to begin with a detection of one of a replying input and a forwarding input, as at 204, with respect to a first message, such as one of the messages 52. Responsive to such detection, a second message is created, as at 208, such as the new message 64. In this regard, it is noted that the advantages of the first temporary dictionary 84 and its help in creating a salutation 108 can be provided with the generation of any message, i.e., even one that did not result from a replying or forwarding input with respect to an existing message, once the recipients 68 are added to the message, depending upon the configuration of the handheld electronic device 4.

Regardless of whether the additional message was created as a result of detecting a replying or forwarding input to an existing message, or if an original message was created, the disambiguation routine or other routine stores, as at 212, the names of the recipients as found in, for example, a "TO:" field or a "CC:" field in the message in a first temporary dictionary 84. The disambiguation routine or other routine may determine, as at 216, whether a second temporary dictionary 92 has already been created for the message or message thread. Such a determination can be made by consulting the lookup table 88. If a second temporary dictionary 92 has already been created for the message thread, its location in the memory 44 is determined as at 220. If, however, no corresponding second temporary dictionary 92 has yet been created, such a second temporary dictionary 92 is created, as at 224. Upon creating such second temporary dictionary 92, the lookup table 88 is updated, as at 228, with entries that correspond with, for example, the location in the memory 44 of the second temporary dictionary 92 and a corresponding subject of the e-mail thread or a hash thereof, for instance. Such an updating operation can be provided with different types of entries in the lookup table 88 without departing from the concept of the invention.

The processor apparatus 20 may detect, as at 232, a text input that may be ambiguous. The disambiguation routine may then determine, as at 236, whether or not the input is a portion of a salutation 108. Such a determination can be made, as mentioned above, by determining the proximity of the text input location 128 to a salutatory expression 112, the presence of the text input location 128 on a first line 104 of the language input field 96, or in other fashions that will be apparent. If it is determined at 236 that the current input is a portion of a salutation 108, the disambiguation routine then determines, as at 240, whether the first temporary dictionary 84 includes a language object stored therein that corresponds with the input. If such a language object is identified, the disambiguation routine may retrieve, as at 244, the entry and a corresponding frequency value. The disambiguation routine may also consult the generic word list 48, as mentioned above, to identify other language objects and corresponding frequency values, as at 248. The identified language objects from the first temporary dictionary 84 and the generic word list 48 may then be output, as at 252 in order of decreasing frequency value. It is noted that the names 140, 144, and the like are anticipated to be associated with relatively higher frequency values than any language objects stored in and obtained from the generic word list 48 and thus are expected to be output as the default output 124. Processing then returns to 232.

If at 236 it is determined that the input is not a part of a salutation 108, processing may continues at 256 where it is determined whether the second temporary dictionary 92 that corresponds with the new message 64 has stored therein any language object that corresponds with the input. If yes, such corresponding language object or objects are obtained, as at 260, from the second temporary dictionary 92, along with any associated frequency value, which likely would be relatively high.

Regardless of whether any such language objects were identified in second temporary dictionary 92, the disambiguation routine obtains from the generic word list 48, as at 248, any language objects that correspond with the input, along with associated frequency values. The disambiguation routine then outputs, as at 252, at least a portion of the identified language objects, whether from the second temporary dictionary 92 or from the generic word list 48, in order of decreasing frequency value. Processing thereafter continues at 232.

The improved handheld electronic device 4 and associated method in accordance with the invention provide facilitated input in appropriate situations including, for example and without limitation, in the situation of a salutation or in entering text when replying to or forwarding an e-mail message. This advantageously reduces the time, effort, and attention required of a user in using the handheld electronic device 4.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A method comprising:
   generating a new message in response to a command, wherein the new message relates to a message thread;
   storing words found in messages associated with the message thread as language objects in a dictionary of language objects associated with the message thread; and
   associating frequency values with the language objects in the dictionary to prioritize the language objects in the dictionary over words not contained in the dictionary.

2. The method of claim 1, further comprising generating the dictionary of language objects upon determining that the message thread dictionary does not exist.

3. The method of claim 1, wherein the language objects are associated with frequency objects containing the frequency values for the language objects.

4. The method of claim 3, wherein the language objects are assigned frequency values higher than words contained in a generic word list.

5. The method of claim 1, wherein the dictionary of language objects is located in a first portion of a memory separate from a generic word list located in a second portion of the memory.

6. The method of claim 1, wherein the command is a replying or forwarding command with respect to at least one message in the message thread.

7. The method of claim 1, further comprising:
detecting a text input; and
identifying, as a priority output for display, at least one language object stored in the dictionary.

8. The method of claim 7, wherein the text input is an ambiguous input.

9. An electronic device comprising:
a memory storing instructions; and
a processor executing the instructions to:
generate a new message in response to a command, wherein the new message relates to a message thread;
store words found in messages associated with the message thread as language objects in a dictionary of language objects associated with the message thread; and
associate frequency values with the language objects in the dictionary to prioritize the language objects in the dictionary over words not contained in the dictionary.

10. The electronic device of claim 9, the processor executing instructions to generate the dictionary of language objects upon determining that the message thread dictionary does not exist.

11. The electronic device of claim 9, wherein the language objects are associated with frequency objects containing the frequency values for the language objects.

12. The electronic device of claim 11, wherein the language objects are assigned frequency values higher than words contained in a generic word list.

13. The electronic device of claim 9, wherein the dictionary of language objects is located in a first portion of a memory separate from a generic word list located in a second portion of the memory.

14. The electronic device of claim 9, wherein the command is a replying or forwarding command with respect to at least one message in the message thread.

15. The electronic device of claim 9, the processor executing instructions to:
detect a text input; and
identify, as a priority output for display, at least one language object stored in the dictionary.

16. The electronic device of claim 15, wherein the text input is an ambiguous input.

17. A tangibly embodied non-transitory computer-readable storage medium storing instructions that, when executed by a processor, perform a method comprising:
generating a new message in response to a command, wherein the new message relates to a message thread;
storing words found in messages associated with the message thread as language objects in a dictionary of language objects associated with the message thread; and
associating frequency values with the language objects in the dictionary to prioritize the language objects in the dictionary over words not contained in the dictionary.

18. The computer-readable storage medium of claim 17, the method further comprising generating the dictionary of language objects upon determining that the message thread dictionary does not exist.

19. The computer-readable storage medium of claim 17, wherein the language objects are associated with frequency objects containing the frequency values for the language objects.

20. The computer-readable storage medium of claim 19, wherein the language objects are assigned frequency values higher than words contained in a generic word list.

21. The computer-readable storage medium of claim 17, wherein the dictionary of language objects is located in a first portion of a memory separate from a generic word list located in a second portion of the memory.

22. The computer-readable storage medium of claim 17, wherein the command is a replying or forwarding command with respect to at least one message in the message thread.

23. The computer-readable storage medium of claim 17, the method further comprising:
detecting a text input; and
identifying, as a priority output for display, at least one language object stored in the dictionary.

24. The computer-readable storage medium of claim 23, wherein the text input is an ambiguous input.

* * * * *